United States Patent [19]

Johnston

[11] Patent Number: 4,559,520
[45] Date of Patent: Dec. 17, 1985

[54] METHOD FOR COMMUNICATION UTILIZING MULTI-MODE RECEPTION

[75] Inventor: Reed H. Johnston, Wellesley, Mass.

[73] Assignee: New England Power Service Company, Westborough, Mass.

[21] Appl. No.: 391,170

[22] Filed: Jun. 23, 1982

[51] Int. Cl.$^4$ .............................................. H04B 3/54
[52] U.S. Cl. .................................. 340/310 R; 370/19; 375/37
[58] Field of Search ....................... 340/310 R, 310 A; 370/19, 119; 375/37, 58

[56] References Cited

U.S. PATENT DOCUMENTS

| | | | |
|---|---|---|---|
| 2,658,189 | 11/1953 | Lovell | 375/37 |
| 3,792,355 | 2/1974 | Miyata | 375/37 |
| 4,105,897 | 8/1978 | Stratton | 340/310 A |
| 4,106,007 | 8/1978 | Johnston | 340/310 A |
| 4,400,688 | 8/1983 | Johnston | 340/310 A |

FOREIGN PATENT DOCUMENTS 1575026 9/1980 United Kingdom .

OTHER PUBLICATIONS

"TWACS—The 60 Hz. Power Line Communication System" Orban, presented 3/80 IEEE, Okla.
"TWACS—The Viability of 60 Hz. Power Line Communication" Orban, presented 3/81 IEEE, Okla.
"TWACS—A New Viable Two-Way Automatic Communication System for Distribution Networks, Part II: Inbound Communication", Mak and Moore, 1984 IEEE.

Primary Examiner—James J. Groody
Attorney, Agent, or Firm—Richard J. Birch

[57] ABSTRACT

A method for improving signal quality while simultaneously enhancing the data rate in a communications system in which individual signaling events are, at least in principle, capable of representing a bit of digital intelligence. When the method is applied to power-line communication systems, the pattern of signaling events extends over some integer multiple of four cycles of the power-line wave. Signaling events of each particular type are found in exactly half of the cycles contained in any pattern. Patterns containing but one type of signaling event are arranged into orthogonal patterns—the term orthogonal implying that each pattern can be sensed only by a detection mode that maximizes the signal therefrom, and the application of any detection mode to a pattern for which it is not optimum will result in no net accumulation of signal. When two types of independent signaling events which yield signals of comparable magnitude are achieved they are arranged into pseudo-orthogonal patterns to further expand the data rate without impairing signal quality. Under these conditions quaternary coding proves to be the preferred technique. Examples are given wherein a multiplicity of simultaneous noninterfering messages are transmitted under circumstances where it is possible to transmit them in synchronism. Where multiple messages cannot be synchronized the method can be used to increase the data rate through the use of encoding schemes based on numerical bases greater than binary.

10 Claims, 9 Drawing Figures

8-CYCLE SEGMENT OF PREAMBLE AND DETECTION MODE

U.S. Patent  Dec. 17, 1985  Sheet 1 of 2  4,559,520
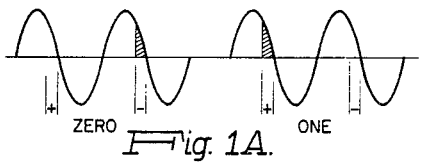
PRIOR ART
ZERO  *Fig. 1A.*  ONE
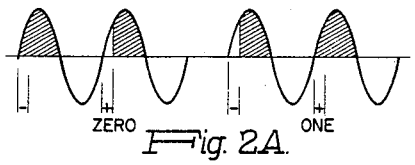
PRIOR ART
ZERO  *Fig. 2A.*  ONE
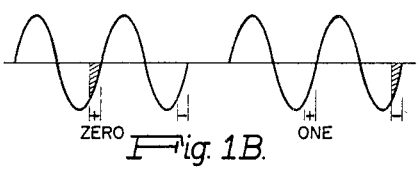
PRIOR ART
ZERO  *Fig. 1B.*  ONE
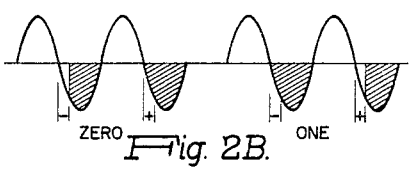
PRIOR ART
ZERO  *Fig. 2B.*  ONE
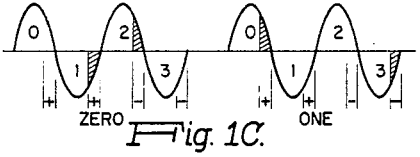
PRIOR ART
ZERO  *Fig. 1C.*  ONE
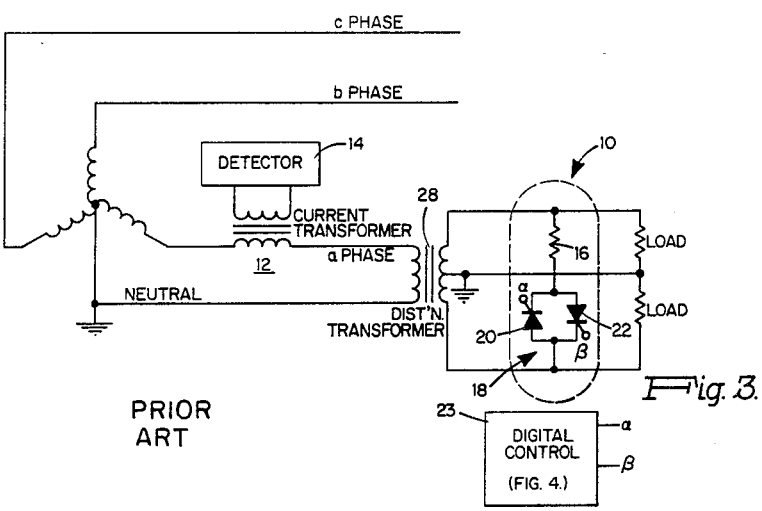
PRIOR ART
*Fig. 3.*

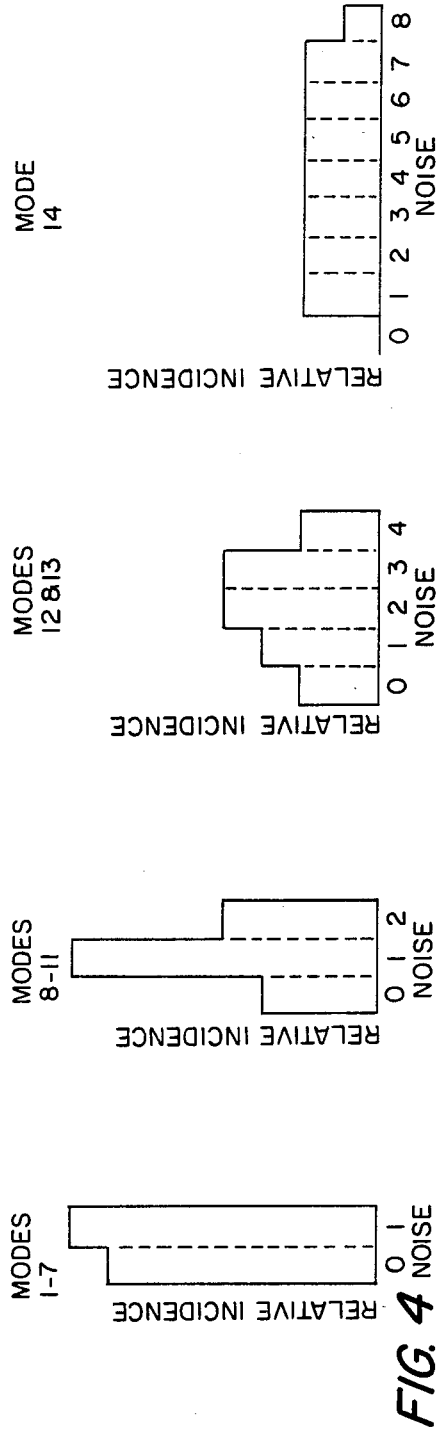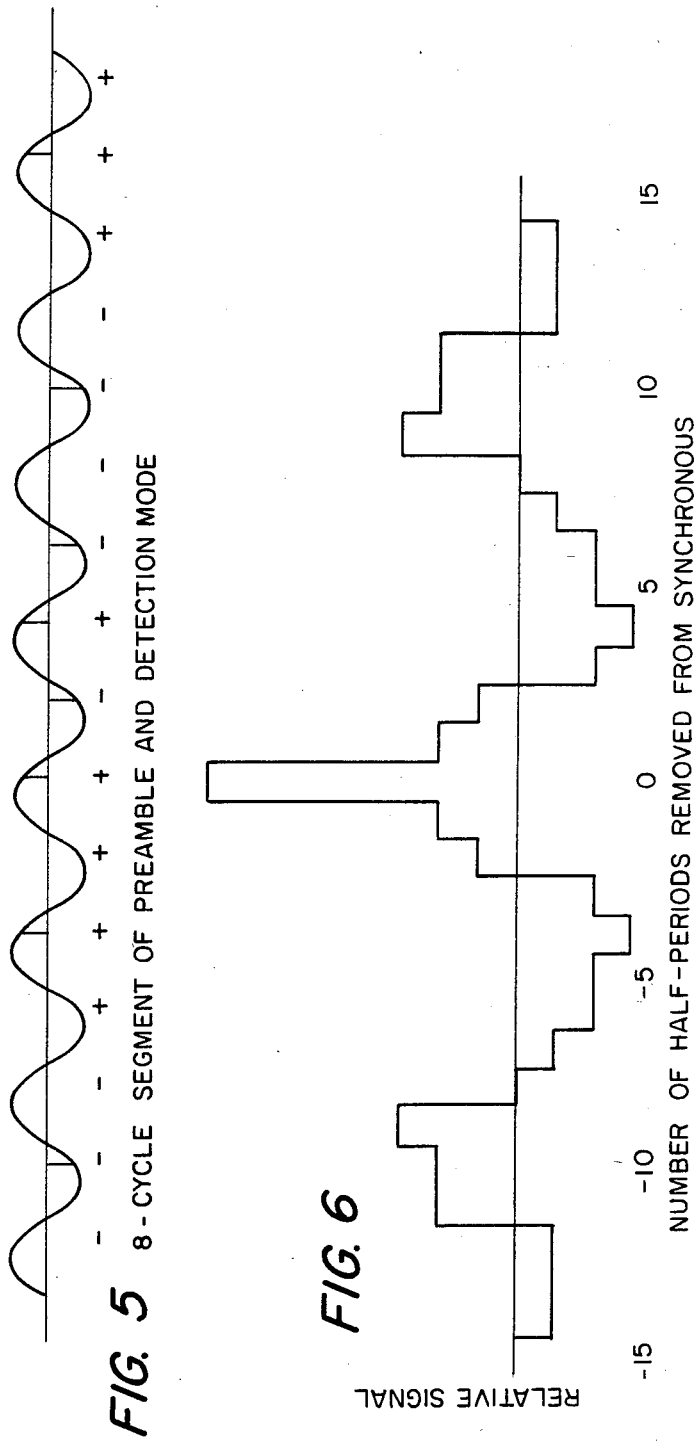

METHOD FOR COMMUNICATION UTILIZING MULTI-MODE RECEPTION

BACKGROUND OF THE INVENTION

The present invention relates to method for increasing the data rate without impairing the signal quality in a communications system for signaling over electric distribution lines from the customers' premises to the distribution substation. This inbound signaling concept has been described in detail in United Kingdom Pat. No. 1,575,026 complete specification published Sept. 17, 1980, the disclosure of which is hereby incorporated by reference.

The basic inbound signaling pattern described in said United Kingdom Pat. No. 1,575,026 occupies two cycles of 60 Hz. FIGS. 1A, 1B, 1C, 2A, 2B, and 3 are reproduced from the corresponding figures in said United Kingdom patent. In order to create a signal pattern for FIG. 1A or 1B a pulse of current is drawn at the customer's meter (on the utility side of the meter) for a very brief period just before the voltage zero-crossing in one of these two cycles; this current does not occur at the same time in the adjacent cycle. Current must flow from the substation to supply this current pulse on the customer's premises; thus the signal can be sensed by examining the current pulse at the substation as shown in FIG. 3. The current pattern produced is very different from that of normal loads that tend to remain the same in successive cycles. Detection of the signal at the substation is performed by subtracting the current in one cycle from the current in the next cycle. If only normal loads are present these currents will be the same in the two cycles and the difference will be zero. In the case of a signal the current pulse is present in one cycle and not in the other. Subtraction leads to either a positive or a negative difference between the two cycles.

To guard against mistaking a change of loads for a genuine signal, the signal pattern is repeated four times to transmit each bit of information reliably. Two current pulses are actually used in the basic signaling pattern. The locations of these pulses within the two cycles of the signaling pattern are shown shaded in FIG. 1C.

An experimental facility designed along the lines described in the referenced U.K. patent was created at the West Methuen substation of Massachusetts Electric Company. Testing revealed that the signal strength attained in this facility was in excess of that required to achieve high quality signaling; it was judged that reliable communication could be achieved using a signal of half the strength used in the test at West Methuen.

By halving the signal strength one could expect to double the data rate. This improved data rate could be realized either by shortening the bit pattern to four cycles wherein the basic pattern of FIG. 1C was repeated only twice, or by maintaining the eight-cycle bit but employing therein only the signaling pattern of FIG. 1A or 1B. In this latter option the doubling of the data would be achieved through the use of two simultaneous transmissions. One should note that this approach which employs a single type of signal in each pattern can be implemented using a transmitter with only one silicon controlled rectifier for switching the signaling resistor—by contrast the four-cycle bit approach would require two SCR's to produce the two types of signal pulses.

Emerson Electric Company of St Louis Mo. has been granted a license to build and sell communications equipment based on the technologies pioneered by New England Power Service Co. and described in said United Kingdom Pat. No. 1,575,026 and in U.S. Pat. Nos. 4,106,007 and 4,105,897. An account of the equipment was given recently in a paper entitled "TWACS—the 60 Hz Power-Line System" presented to the Pacific Coast Electric Association on Mar. 13, 1980 by Julius Orban.

The Orban paper describes the technology based upon a bit of duration corresponding to eight periods of the 60 Hz waveform—this is the duration of the bit used as West Methuen test site. The paper reports that more than one inbound message can be transmitted simultaneously (such as might be achieved using the patterns of FIGS. 1A and 1B for two types of bits—as explained above). The paper reports that "up to four" simultaneous messages can be used in the "inbound" (load-to-source) direction presumably by employing the patterns of FIGS. 1A, 1B, 2A and 2B for the four types of messages.

The technology described herein permits signal strength equal to twice that achievable through the use of any one of the signaling patterns of FIGS. 1A, 1B, 2A and 2B in the manner suggested by the Orban paper. In addition it provides up to fourteen simultaneous binary messages with the preferred configuration being up to seven simultaneous messages in quaternary code, using eight-cycle characters.

One may understand the essential feature of the present invention by references to the aforementioned patents and the power-line communication systems described therein. However, one should recognize that the invention is capable of wider application than the specific application detailed above. In fact, it is applicable to any signaling scheme wherein each signaling event is capable, at least in principle, of representing a bit of intelligence. As used herein the term "signaling event" denotes the single application and the subsequent removal of a signaling load. One finds, for example that this invention can be applied to increase signal quality and to simultaneously improve data rate in the "outbound" signaling scheme which is marketed by General Electric Company, Ltd. of England under the name "Cyclotrol". On the other hand, this invention is not applicable to the signaling scheme of Haberly, as described in U.S. Pat. No. 3,509,537, since in that scheme one requires a plurality of signaling events to represent a single bit of intelligence.

In the present invention the signaling patterns can be organized in such a manner that a four-fold increase in signal strength can be realized by lengthening the bit to eight cycles rather than the basic two cycles, and that by lengthening the duration of each pattern one can actually realize an increase rather than a decrease in data rate. This seeming contradiction that the data rate can be increased by employing patterns of longer duration arises from the use of orthogonal patterns of signaling events over intervals that persist for an even multiple of the basic signaling event.

At this point, some attention should be given to the properties of these patterns which have been described previously as "orthogonal". These patterns occur in pairs; the cycles which contain signaling events for one member of the pair do not contain signaling events for the other member, and vice-versa. The signal that is sensed when a member of a pair is detected will be the maximum signal that can be accumulated from the signaling events therein—which implies that all of the samples from cycles containing signaling events are accumulated in the same sense. The signal sensed from the two members of the pair will be equal in magnitude but opposite in sign.

The orthogonal feature is that the detection mode appropriate to the sensing of the members of one pair of patterns will accumulate no net signal if it is applied to any pattern from another pair of patterns. This property must prevail for all detection modes and the associated pairs of patterns—thus, clearly, there will be a limited number of such pattern pairs that can be associated with patterns of a given duration. The totality of the pairs of patterns and their properly associated detection modes which exhibit this orthogonal property can conveniently be referred to as an orthogonal family.

It is contrary to one's intuition that an increased data rate is to be realized through the use of patterns which prolong the duration of individual bits—it is obvious that one can attain an enhanced signal quality through the use of longer patterns, but one would normally expect this to be associated with a reduction in data rate as was the case in the teaching of the above-mentioned United Kingdom patent.

The present invention relates to the manner in which one can attain this simultaneous enhancement of signal quality and of data rate.

The principal object of the invention is the realization of improved data rate while improving signal quality in communication technologies wherein each signaling event is capable, at least in principle, of representing a bit of digital intelligence.

An object of the invention is the realization of simultaneous, synchrous transmissions of multiple noninterfering messages over the same communication medium.

It is a feature of the present invention that number bases greater than two are used in the transmitted messages to produce messages of shorter duration.

It is another object of the invention to achieve an enhanced data rate in transmissions where it is not possible to provide the synchronization needed to permit transmissions from a multiplicity of transmitting sites.

These objects and features and other desiderata will best be understood from a detailed description of a preferred embodiment selected for purposes of illustration and shown in the accompanying drawing, in which:

FIGS. 1A, 1B, 1C, 2A, 2B and 3 are the corresponding figures from the above-mentioned United Kingdom Pat. No. 1,575,026.

FIG. 4 is a plot of the relative incidence of noise of various relative magnitudes for a single step in the background current appearing during an eight-cycle pattern in the case of family of patterns that is chosen for its good imunity to noise of this nature;

FIG. 5 shows the locations of signaling events in an eight-cycle pattern that is used in creating a preamble for establishing the synchronism between the transmitter and the receiver in circumstances where this synchronism cannot be achieved by other means; and, FIG. 6 depicts the relative signal strength that is sensed as the detection pattern moves through synchronism in the preamble pattern of FIG. 5.

A DETAILED DESCRIPTION OF A PREFERRED EMBODIMENT OF THE INVENTION

Turning now to the drawings, the prior art signaling patterns of FIGS. 1A, 1B, 1C, 2A, and 2B have already been described. A brief discussion of the general configuration of the prior art signaling apparatus shown in FIG. 3 will be helpful in understanding the nature of the signaling technique in one implementation of the present invention.

FIG. 3 depicts the general configuration of the signaling apparatus 10 within the electric distribution feeder indicated generally by the reference numeral 12. The various signaling transmitters may initially be locked in synchronism among themselves and with the receiver (detector) 14 in response to an outbound message (the facility for which is not depicted in FIG. 3) which elicits the inbound transmissions. This synchronization in response to the outbound message provides the second level of synchronization needed to impart the intelligence and aditionally allows the successive transmissions to be correctly scheduled so as to transmit in a non-overlapping pattern at times that will be precisely known at the receiving station. In the absence of such second level synchronization achieved through an outbound transmission, a plurality of detectors 14 can be employed to operate at different synchronizations.

In FIG. 3 the transmitter 10 proper is depicted within an area enclosed in dashes. The transmitter comprises a resistive load 16 and a switch indicated generally as 18. In FIG. 3, switch 18 is depicted as anti-parallel silicon controlled rectifiers 20 and 22. The silicon controlled rectifiers are gated by signals designated $\alpha$ and $\beta$ which are derived from a digital control circuit 23. The digital control logic 23 generates gating signals for the SCR which produce a loading pattern conforming to the bit pattern convention of FIGS. 1A, 1B, 1C, 2A and 2B and the binary content of the message.

USE OF MATRIX NOTATION

There is no unique orthogonal family of signaling events for patterns of a specified duration. In fact for patterns built upon two types of signaling events the number of equally valid families are some 36,864, $3 \times 10^{13}$ and $10^{24}$ for four-cycle, eight-cycle and twelve-cycle patterns respectively. A matrix notation proves advantageous in preserving some of the generality of the discussion of the various options. The fact that a matrix notation proves convenient should not be mistaken for any implication that the invention is mathematical in nature.

In the initial discussion one limits the consideration to patterns of signaling events of a single type. Once this organization is understood one can easily extend the teaching to patterns containing a plurality of signaling events.

In reception a sample is taken at the site where the signal is to be found in each cycle that contains the signal and at the corresponding site in all cycles that do not contain a signaling event. The location, relative to the successive cycles of the voltage wave is the same for all cycles. This site is located as a measured delay beyond the voltage zero-crossing. The various samples taken in this fashion are accumulated so as to yield the intended signal. This implies that all the samples which contain the signaling event are to be accumulated in the same sense and all other samples are to be accumulated in the opposite sense.

In the absence of signal the detection process should yield zero signal. Thus there should be an equal number of additive and subtractive operations in the detection process. This implies that there will be a signaling event in half of the cycles of the pattern.

One desires that the detection mode should accumulate the signal from one member of a pair of patterns in one sense and accumulate the signal in the opposite sense for the other pattern of the pair. This implies that the two patterns that constitute a pair will be such that the cycles that contain signaling events for one pattern of the pair will not contain signaling events in the other pattern of the pair and vice-versa.

In order that a detection mode may fail to accumulate a net signal when it processes a pattern other than one from its associated pair, one requires that patterns that do not belong to the same pair, have half of their signaling events in the same cycle and half in different cycles. This implies that there must be an even number of signaling events in each pattern. This combined with the fact that half of the cycles contain signaling events leads to the conclusion that the pattern must persist for a multiple of four cycles. In this account one limits the detailed discussion to patterns that persist over four, eight or twelve cycles. This probably covers the range of practical interest; those who may wish to extend the teaching will find no difficulty in doing this.

The detection mode is essentially a prescription as to whether the sample taken in the successive cycles is to be added or subtracted. One may conveniently view this as a row in a matrix wherein each element is either $+1$ or $-1$ according to whether the sample is to be added or subtracted. The samples can then be regarded as elements in a column matrix, and the process of detection is simply matrix multiplication.

The various detection modes can operate simultaneoulsy, yet each will sense only the pattern to which it pertains. Thus one may regard the complete simultaneous detection process as pre-multiplication of a pattern matrix by a detection matrix. In the detection matrix there is a column for each successive cycle in the pattern and a row for each permitted detection mode. The various patterns will then be represented as a matrix wherein there is a column for each pair of patterns and a row for each successibe cycle.

The simplest way to visualize this representation is to describe the detection matrix, then describe how the pattern matrix is derived from the detection matrix. The detection matrix is not unique, but each will have the following four characteristics:

(1) The successive columns correspond to the successive cycles in the pattern.

(2) There is a row for each permitted detection mode.

(3) Each contains an equal number of $+1$ and $-1$ elements, with no other elements present.

(4) On comparing any two rows only half the $+1$ elements and only half the $-1$ elements appear in the same column. Matrices conforming to these characteristics are not unique in that, given any matrix that satisfies these conditions one may obtain another by any combination of the operations:

(1) interchange of any two rows;
(2) interchange of any two columns; and
(3) multiplication throughout any row by $-1$.

It will be sufficient to give an example of a matrix which satisfies these criteria for the four-eight-and-twelve-cycle patterns—then others may be generated through the application of the above permitted operations. The matrices below are satisfactory detection matrices.

$$D_4 = \begin{Vmatrix} +1 & -1 & -1 & +1 \\ +1 & -1 & +1 & -1 \\ +1 & +1 & -1 & -1 \end{Vmatrix}$$

(four-cycle)

$$D_8 = \begin{Vmatrix} +1 & -1 & +1 & -1 & +1 & -1 & +1 & -1 \\ +1 & -1 & +1 & -1 & -1 & +1 & -1 & +1 \\ +1 & -1 & -1 & +1 & +1 & -1 & -1 & +1 \\ +1 & -1 & -1 & +1 & -1 & +1 & +1 & -1 \\ +1 & +1 & -1 & -1 & +1 & +1 & -1 & -1 \\ +1 & +1 & -1 & -1 & -1 & -1 & +1 & +1 \\ +1 & +1 & +1 & +1 & -1 & -1 & -1 & -1 \end{Vmatrix}$$

(eight-cycle)

$$D_{12} = \begin{Vmatrix} +1 & +1 & +1 & +1 & +1 & +1 & -1 & -1 & -1 & -1 & -1 & -1 \\ +1 & +1 & +1 & -1 & -1 & -1 & -1 & -1 & -1 & +1 & +1 & +1 \\ +1 & +1 & -1 & -1 & -1 & +1 & +1 & -1 & -1 & -1 & +1 \\ +1 & -1 & -1 & -1 & +1 & +1 & -1 & -1 & +1 & -1 & +1 & +1 \\ +1 & +1 & -1 & +1 & -1 & -1 & -1 & +1 & +1 & -1 & +1 & -1 \\ +1 & -1 & +1 & -1 & -1 & +1 & -1 & +1 & +1 & +1 & -1 & -1 \\ -1 & +1 & -1 & -1 & +1 & +1 & -1 & -1 & +1 & +1 & +1 & -1 \\ +1 & -1 & -1 & +1 & +1 & -1 & -1 & +1 & -1 & +1 & -1 & +1 \\ -1 & -1 & +1 & +1 & -1 & +1 & +1 & -1 & -1 & +1 & -1 & +1 \\ +1 & -1 & -1 & +1 & -1 & +1 & +1 & -1 & -1 & +1 & +1 & -1 \\ +1 & -1 & +1 & -1 & +1 & -1 & +1 & +1 & -1 & -1 & +1 & -1 \end{Vmatrix}$$

(twelve-cycle)

One can conveniently define a character matrix in terms of the detection matrix. There are as many character matrices as there are rows in the detection matrix. In the successive character matrices only a single column contains nonzero elements, and this nonzero column progresses across the successive matrices. The elements in the nonzero column are proportional to the corresponding column in the transpose of the detection matrix. The proportionality constant may be different for the successive character matrices—for the character matrix wherein the n th row contains nonzero elements one may conveniently denote this proportionality constant by $s_n/2$. This constant $s_n/2$ accounts for the possibility that the strengths of signals from different sites might be different. This situation can arise as a consequence of there being a different voltage across the signaling resistor 16 (FIG. 3) at the signaling site, because the transformation to a step-down area results in a signal of differing amplitude, or because of dispersion or attenuation in transmission.

One may employ the symbol D to denote the detection matrix and the symbol $C_n$ to denote the character matrix which has nonzero elements in its n th column. Associated with each character matrix is an average matrix $A_n$ which is obtained from the character matrix by simply changing all the minus signs that appear before elements $-s_n/2$ to plus signs. The pattern matrix which yields a positive signal on detection is then $A_n + C_n$ and the pattern matrix which yields the negative signal on detection is $A_n - C_n$.

Because the product $D.A_n$ is invariably the null matrix, one recognizes that the average matrix contributes nothing to the detected signal—it has only the affect of adding to the pre-existing background current, the current that represents the average current associated with the signaling events. Thus the detection process can be viewed as the pre-multiplication of $C_n$ or $-C_n$ by the detection matrix D.

In an attempt to remove some of the abstraction one may illustrate this in the case of the four-cycle detection matrix $D_4$ specified above—the character matrices are:

$$C_1 = \begin{Vmatrix} +s_1/2 & 0 & 0 \\ -s_1/2 & 0 & 0 \\ -s_1/2 & 0 & 0 \\ +s_1/2 & 0 & 0 \end{Vmatrix} \quad C_2 = \begin{Vmatrix} 0 & +s_2/2 & 0 \\ 0 & -s_2/2 & 0 \\ 0 & +s_2/2 & 0 \\ 0 & -s_2/2 & 0 \end{Vmatrix}$$

$$C_3 = \begin{Vmatrix} 0 & 0 & +s_3/2 \\ 0 & 0 & +s_3/2 \\ 0 & 0 & -s_3/2 \\ 0 & 0 & -s_3/2 \end{Vmatrix}$$

Here one has allowed for the possibility that the three signals may not be of equal magnitude. Clearly there is no need to define the average matrices specifically since these contribute nothing on detection.

In the detection process in which one signals with a pattern that yields positive signals for modes 1 and 3 and negative signals for mode 2, the detection corresponds to the multiplication:

$$D \cdot (C_1 - C_2 + C_3) = \begin{Vmatrix} +2s_1 & 0 & 0 \\ 0 & -2s_2 & 0 \\ 0 & 0 & +2s_3 \end{Vmatrix}$$

The absence of off-diagonal terms results from the orthogonality of the family of patterns.

These remarks pertaining to orthogonal patterns where only a single type of signaling event is permitted, have now laid the foundation on which one can understand the exploitation of patterns based upon a plurality of signaling events. Here we limit the discussion to signaling events of two types which are mutually independent. Should a situation arise in which more than two types of signaling events can be used with advantage, it will be apparent that the teaching of this invention can be extended to this broader case (e.g., one could base a communications scheme on the four types of signaling events as depicted in FIGS. 1A, 1B, 2A and 2B).

EXPLOITING THE INDEPENDENCE OF SIGNALING EVENTS OF DIFFERENT TYPES

Occasions arise when signaling events of two distinct and independent types are possible—such is the case in the "inbound" signaling scheme of the previously mentioned United Kingdom Patent where there are two polarities of relatively short pulses as depicted in FIGS. 1A and 1B, and in the case of the referenced "Cyclotrol" scheme where one could provide signaling by applying the signal prior to the voltage zero-crossing of either sense.

There may also arise situations where one can achieve independent signaling events—but at the expense of increasing the hardware. This siutaion arises in an important case where one wishes to employ a capacitive signaling load in circumstances in which the capacitance is precharged to the crest voltage and is connected to the line when the line voltage coincides with the precharge voltage, and the duration of the signaling event is a half-period of the power-line voltage. Clearly, the capacitance will be left in a charged condition, but the polarity of the charge will be reversed. If the pattern of signaling events of two types is such that one requires successive events of one polarity prior to the time when events of the opposite polarity occur, then one will need to provide additional capacitors in the appropriate condition of precharge.

Relative to the condition encountered in the case of the precharged capacitors, one should observe that the hardware requirement will be determined at least in part, by the pattern of signaling events that is employed—thus the selection of signaling patterns is no mere matter of programming, but actually impacts the hardware selection in this case.

In extending the foregoing discussion of matrix representation to two types of signaling events, one may conveniently employ a prime on quantities that pertain to the second type of signaling event, and employ a double prime on quantities that pertain to the two types of signaling event used in combination.

When two types of signaling events are possible, and the signals from these two types are of comparable magnitude, one can expand the data handling capability without degrading the signal quality. The discussion of this possibility may be set forth in the form of a pseudo-orthogonal detection matrix wherein the number of rows and columns is double the number that would pertain for a single type of signaling event.

The term "pseudo-orthogonal" is used here to imply that if the signals from the two types of signaling events were truly of equal magnitude, then the orthogonal properties would be exhibited. When the signals from the two types of signaling events are not equal one finds that there is a ghost signal in addition to the intended signal. We shall discover that this ghost signal need not present any problems.

The fact that the detection matrix for the pseudo-orthogonal family contains twice as many columns as that for a single type of signaling event does not imply that the pattern extends over twice as many cycles—half the columns pertain to one type of signaling event and the other half of the columns pertain to the other type of signaling event. The doubling of the number of rows in the detection matrix does however imply that there are twice as many orthogonal (or nearly orthogonal) pairs of patterns.

A suitable detection matrix for the pseudo-orthogonal family is:

$$D'' = \begin{Vmatrix} D & D' \\ D & -D' \end{Vmatrix}$$

One should note here that D' not only pertains to the second type of signaling event, but it need not be constructed in the same fashion as D, but can be derived from D through application of the various permitted operations which enables one to derive a new detection matrix from another valid detection matrix. As the detection matrix D'' is defined above, the columns of the right hand half pertain to the second type of signaling event.

One may illustrate the detection matrix and the ghost signals by considering a detection matrix appropriate to a four-cycle pattern with two types of signaling events. The matrix D″ below is derived from the four-cycle matrix cited above where one has interchanged the first and third columns of D to obtain D′.

$$D'' = \begin{Vmatrix} +1 & -1 & -1 & +1 & -1 & -1 & +1 & +1 \\ +1 & -1 & +1 & -1 & +1 & -1 & +1 & -1 \\ +1 & +1 & -1 & -1 & -1 & +1 & +1 & -1 \\ +1 & -1 & -1 & +1 & +1 & +1 & -1 & -1 \\ +1 & -1 & +1 & -1 & -1 & +1 & -1 & +1 \\ +1 & +1 & -1 & -1 & +1 & -1 & -1 & +1 \end{Vmatrix}$$

To obtain the associated character matrix one proceeds as previously, making the elements of the nonzero column proportional to the elements of the transpose of the detection matrix—except that in this case one must employ $s_n/2$ as the proportionality constant for the elements that pertain to the first type of signaling event and $s'_n/2$ for the elements that pertain to the second type of signaling event. The character matrix which pertains to the fifth mode of detection then becomes $$C''_5 = \begin{Vmatrix} 0 & 0 & 0 & 0 & +s_5/2 & 0 \\ 0 & 0 & 0 & 0 & -s_5/2 & 0 \\ 0 & 0 & 0 & 0 & +s_5/2 & 0 \\ 0 & 0 & 0 & 0 & -s_5/2 & 0 \\ 0 & 0 & 0 & 0 & -s'_5/2 & 0 \\ 0 & 0 & 0 & 0 & +s'_5/2 & 0 \\ 0 & 0 & 0 & 0 & -s'_5/2 & 0 \\ 0 & 0 & 0 & 0 & +s'_5/2 & 0 \end{Vmatrix}$$

The signals which are produced when the various detection modes sense this pattern are obtained in carrying out the matrix multiplication $D'' \times C''_5$ to obtain $$D'' \times C''_5 = \begin{Vmatrix} 0 & 0 & 0 & 0 & 0 & 0 \\ 0 & 0 & 0 & 0 & 2(s_5 - s'_5) & 0 \\ 0 & 0 & 0 & 0 & 0 & 0 \\ 0 & 0 & 0 & 0 & 0 & 0 \\ 0 & 0 & 0 & 0 & 2(s_5 + s'_5) & 0 \\ 0 & 0 & 0 & 0 & 0 & 0 \end{Vmatrix}$$

Clearly, if $s_5 = s'_5$ there would be no off-diagonal elements in this product. When these signal strengths differ somewhat one finds that detection mode 2 senses a ghost signal. The ratio of the ghost signal to the intended signal is the ratio of the difference of the two signals to the sum of the two signals. This ratio will be small if the two signals are of comparable magnitude.

Notice that in the pseudo-orthogonal system there is only one detection mode that can produce a ghost signal for each of the intended signals. For all other detection modes the system remains truly orthogonal.

If one elects to assign a detection mode to each of the simultaneous binary messages, then the intended signal for mode 2 will have superimposed the ghost signal associated with the transmission in mode 5. This will not produce any problem so long as the difference signal from the ghost is small compared to the intended sum signal for that detection mode. One must, however, become concerned as to the validity of this requirement in instances where the intended signal is inclined to be weak, and the ghost signal may result from the imperfect cancellation of two relatively strong signals. The concern becomes acute if the signal resulting from a signaling event exhibits an appreciable ringing so as to extend into the region where the signaling event of the other type must be sensed. In this case one finds that the imperfect cancellation becomes message-dependent.

One can avoid this problem by assigning the two detection modes, that can interact to produce ghosts, to the same transmitting site. In this case one will transmit only one pattern of the four associated with the two detection modes. The transmitted message will then be encoded in quaternary code, since the choice among the four permitted patterns can be used to represent the digits 0 through 3. One no longer has the problem of sensing the intended signal in the presence of a ghost signal on the same detection mode—rather one has merely to recognize that the intended sum signal in one of the detection modes is larger than the difference signal appearing as the ghost in the other detection mode. Here one is recognizing that the sum of two positive quantities of comparable magnitude is larger than the difference of the same two quantities—a very different problem from the sensing of the sum of two quantities in the presence of the difference of two quite different quantities. Through the use of quaternary coding one can eliminate the possibility of trouble from ghosts. There is no loss in data rate in this option, since one achieves twice the data rate on each of half as many simultaneous transmissions.

From the point of view of exploring the noise that may result from changes in the current that supplies steady loads, the arrangement of the detection matrix with the right half pertaining to the second type of signaling event is not very satisfactory. It is preferable that the columns that pertain to the two types of signaling events in the same cycle should be located in juxtaposition—yet one needs to take precautions to recognize that alternate columns pertain to the different types of signal. The matrix below pertains to eight-cycle patterns where the columns that pertain to the second type of signaling event contain elements that are slightly lowered in the array.

This particular array is derived from the eight-cycle detection matrix quoted previously, with D′ identical with D. Then the various columns from D′ have been placed adjacent to the columns of D which pertain to the same cycle. This particular matrix is well-suited to signaling in a fashion which will achieve good immunity to noise associated with changing load current. One should recognize that in the TWACS scheme to which this matrix is particularly suited the two types of signaling events are of opposite polarity.

The detection matrix displayed below is only one of the many that can be used—but when one comes to explore the immunity to noise arising from the fact the the background may not be truly periodic, one finds that there are preferences among the many otherwise equally valid detection matrices.

$$D'' = \begin{Vmatrix} \begin{Vmatrix} +1 & +1 & -1 & -1 & +1 & +1 & -1 & -1 & +1 & +1 & -1 & -1 & +1 & +1 & -1 & -1 \\ +1 & +1 & -1 & -1 & +1 & +1 & -1 & -1 & -1 & -1 & +1 & +1 & -1 & -1 & +1 & +1 \\ +1 & +1 & -1 & -1 & -1 & -1 & +1 & +1 & +1 & +1 & -1 & -1 & -1 & -1 & +1 & +1 \\ +1 & +1 & -1 & -1 & -1 & -1 & +1 & +1 & -1 & -1 & +1 & +1 & +1 & +1 & -1 & -1 \\ +1 & +1 & +1 & +1 & -1 & -1 & -1 & -1 & +1 & +1 & +1 & +1 & -1 & -1 & -1 & -1 \\ +1 & +1 & +1 & +1 & -1 & -1 & -1 & -1 & -1 & -1 & -1 & -1 & +1 & +1 & +1 & +1 \\ +1 & +1 & +1 & +1 & +1 & +1 & +1 & +1 & -1 & -1 & -1 & -1 & -1 & -1 & -1 & -1 \end{Vmatrix} \\ \begin{Vmatrix} +1 & -1 & -1 & +1 & +1 & -1 & -1 & +1 & +1 & -1 & -1 & +1 & +1 & -1 & -1 & +1 \\ +1 & -1 & -1 & +1 & +1 & -1 & -1 & +1 & -1 & +1 & +1 & -1 & -1 & +1 & +1 & -1 \\ +1 & -1 & -1 & +1 & -1 & +1 & +1 & -1 & +1 & -1 & -1 & +1 & -1 & +1 & +1 & -1 \\ +1 & -1 & -1 & +1 & -1 & +1 & +1 & -1 & -1 & +1 & +1 & -1 & +1 & -1 & -1 & +1 \\ +1 & -1 & +1 & -1 & -1 & +1 & -1 & +1 & +1 & -1 & +1 & -1 & -1 & +1 & -1 & +1 \\ +1 & -1 & +1 & -1 & -1 & +1 & -1 & +1 & -1 & +1 & -1 & +1 & +1 & -1 & +1 & -1 \\ +1 & -1 & +1 & -1 & +1 & -1 & +1 & -1 & -1 & +1 & -1 & +1 & -1 & +1 & -1 & +1 \end{Vmatrix} \end{Vmatrix}$$

REDUCING NOISE

It is unlikely that a large step in the current that supplies the normal loads will occur more than once within the span of a single eight-cycle pattern. One can think of such a disturbance as a unit step which occurs between any two of the columns, and ignore the otherwise truly periodic background current that would persist in the absence of signal. Then the relative contribution of such a step to the noise will depend upon where the step is introduced. One can assess the relative magnitude of such discontinuities by merely counting back from right to left along each row to the site of the postulated discontinuity, adding or subtracting according as the raised element is $+1$ or $-1$ and subtracting or adding according as the lowered element is $+1$ or $-1$. (This distinction in the way these elements are treated arises because the second type of signaling event is of polarity opposite to that of the first.)

To remove the abstraction of this instruction, suppose that a unit step in background were introduced between the sixth and seventh column of the detection matrix, and we wish to sense the significance with respect to the ninth detection mode. Proceeding along the ninth row from right to left, and reversing the sign for the lowered elements one finds the accumulating sum $$+1+1-1-1+1+1-1-1-1-1 = -2$$

One can rank the relative noise from a step in background current at different locations within each of the detection modes. This was done and the results are plotted in FIG. 4 as histograms of the relative noise contributions for the various detection modes.

The particular matrix cited above was not selected at random, rather, it is one which exhibits good immunity to such noise for a majority subfamily of the entire family of the permitted patterns. Yet, in the interest of high quality signaling one should reject certain of the modes of detection which comprise at least one minority subfamily of the entire family of permitted patterns of signaling events. The preferred scheme for quaternary signaling is modes 1 & 8; modes 2 & 9; modes 3 & 10; modes 4 & 11; then employ two modes from modes 5, 6, or 7 for the fifth quaternary channel. On referring to FIG. 4, one will discover that this selection utitlizes only the modes that tend to exhibit the smaller noise signal from sudden changes in the background signal; the pairs are chosen so that problems from ghosts disappear and the patterns which exhibit the larger noise occur only half the time in any message where the pattern tends to be reasonably random over the length of the message. If message preambles are used one would prefer that these employ predominantly modes 1 through 7.

One can survey the options for patterns exhbiting good noise immunity for four-cycle patterns, and compare the steps in noise that might result from a change in background signal. One easily finds that the performance in terms of signal-to-noise quality is inferior for the four-cycle patterns than for the eight-cycle patterns, and the achievable data rate with good noise immunity is better with the eight-cycle pattern. The data rate achievable using the above selected patterns would be 75 bits per second over the total of five simultaneous channels. This is to be compared to the 30 bits per second that could be achieved if the single signaling event were employed to represent a bit of digital intelligence.

The contrast between the signal in this eight-cycle pattern and the background of the normal load current is the same as that for the eight-cycle patterns employed at the West Methuen test site—thus the signal quality is far superior to that obtainable when a single signaling event is used to represent each bit. The contrast between each pattern is the same as would be achieved between ones and zeros in a single transmission using signals of half the strength used at West Methuen—and experiments established that such contrast would be adequate to insure high quality communication.

Comparing this with the performance at West Methuen one has achieved a ten-fold improvement in data rate while maintaining the same contrast relative to background and halving the contrast between ones and zeros.

Inevitably, in communicating schemes which use the power lines as the communicating medium, there will be rare circumstances in which a very large transient in the line will destroy whatever messages are then being transmitted. It is unlikely that two such catastrophic events would occur within the duration of a single message. The use of quaternary code rather than binary code will halve the number of messages that are being transmitted at any one time, yet not reduce the data rate. One concludes, therefore, that through the use of quaternary code rather than binary code one can halve the number of messages that are lost to these rare catastrophic transients.

TRANSMISSIONS FROM A SINGLE SITE

The preceding account has been based on the assumption that it will be possible to synchronize the transmissions from the various sites. In the bi-directional signaling schemes of U.S. Pat. No. 4,106,007 and United Kingdom Pat. No. 1,575,026 this is achieved easily, since the outbound message which elicits the inbound responses establishes the time at which the inbound message is to begin. In other communication schemes this synchronization may not be feasible.

If the outbound message were transmitted by radio then it would probably be feasible to arrange that the various inbound responses occurred synchronously, but in schemes such as the ripple control approach that has been used so extensively for outbound signaling over power lines in Europe, the bit rate is too slow to insure synchronization of simultaneous inbound responses. In this case, one must employ the inbound transmission in a fashion which will establish an agreed temporal recognition between the inbound transmitter and the inbound receiver—one will then employ the multiplicity of patterns to effect more rapid signaling, reducing the duration of the individual messages through the use of number bases greater than two.

The temporal recognition which effectively establishes a synchronization between the inbound transmitter and the inbound receiver (the synchronization which is established through the "outbound message") is best accomplished through the use of a preamble when other convenient means is not available. A rather suitable preamble is depicted in FIG. 5. As the detection algorithm appropriate to the pattern of FIG. 5 moves through this pattern, seeking to lock on at intervals of a half-cycle the relative signal levels that are sensed are those shown in FIG. 6. Clearly this preamble permits one to lock onto the inbound transmission.

One can enhance the security of the lock-on by employing this preamble pattern twice with a separation of eight cycles of zero signal separating the patterns, and with similar periods of zero signal preceding and following the patterns. Having once achieved an agreement between transmitter and receiver as to the temporal registration one is then free to exploit the multiplicity of patterns for increasing the data rate in the ensuing message.

In the preceding section one has identified twenty patterns that exhibit good noise immunity against changes in background current in the case of eight-cycle patterns. One could use these in a number base up to 20. More rapid transmission would be realized if one provided at the same signaling site the capability of signaling two patterns synchronized to the same temporal reference—e.g. a pair of resistor and SCR combinations, such as is shown in FIG. 3. In this case one would use the two transmitters in synchronization to provide a double-strength signal for the preamble that establishes the synchronization between transmitter and receiver, then in the message proper one would assign ten of the possible patterns to one of the transmitting units (taking care to assign patterns that could create ghosts to the same unit) and assign the other ten patterns to the other transmitting unit. If one pursued this approach, one could realize a data rate of fifteen decimal digits per second—this is equivalent to optimum utilization of 50 bits per second once the preamble was concluded.

IMPLEMENTATION USING MICROPROCESSOR

The concept of operating a large number of detectors so as to recognize the particular pattern or patterns that are transmitted would prove very cumbersome were it not for the recent evolution of the low-cost microprocessor. The implementation of the various detection modes is greatly facilitated by digitizing the samples from the corresponding portions of the successive cycles within the character, then combining these in the various additive/subtractive patterns required for the various detection modes. A single microprocessor can thus produce a succession of digitized outputs which will correspond to the signals derived in the various detection modes. Thus, while the microprocessor is in no way essential to the teaching of this invention, it does exert a very favorable impact on the economics of the detection process.

GENERAL PHILOSOPHY

The above described details are intended to be merely illustrative of the many ways in which the present invention can be employed in communication schemes wherein each signaling event is, at least in principle, capable of representing a bit of digital intelligence. The teaching is based upon the recognition that through the use of patterns of increased length, which lead to signal enhancement, one can achieve an improvement, rather than suffer a degradation, in data rate.

Those skilled in the arts will easily translate the teaching described in detail herein to the special needs of the various systems where this invention can be applied with advantage.

What I claim and seek to secure by Letters Patent of the United States is:

1. A method, applicable to communicating schemes on electric powerlines wherein a single signaling event of at least one type is in principle capable of representing a binary bit, whereby one may simultaneously improve signal quality and increase data rate, the said method comprising the steps of:
    (i) representing every element of digital intelligence in terms of a pattern from a selected family of orthogonal patterns, where such selected family of patterns is comprised exclusively of signaling events of the same, at least one, type and where each pattern extends over an interval corresponding to the same integer multiple of four periods of the powerline frequency, and wherein the signaling events comprising each pattern are located in exactly half of the cycles contained in said pattern, each said pattern of signaling events being impressed upon the electric powerline at a transmitting site;
    (ii) for the recognition of a pattern from the selected family of orthogonal patterns, employing at the receiving site a multiplicity of simultaneous detection modes, in number equal to half the number of patterns in the selected orthogonal family, and operating in such fashion that for each detection mode samples from corresponding portions of successive cycles in the pattern are combined in an equal number of additive and subtractive operations so as to accumulate signal from, and distinguished between, the pair of patterns with which that detection mode is uniquely associated, yet fail to accumulate signal from any pre-existing periodic background or from any pattern of the selected orthogonal family other than the pair of patterns with which the detection mode is uniquely associated;
    (iii) processing the signals accumulated in the various detection modes so as to recognize the, at least one, transmitted pattern, which represents the element of digital intelligence and thereby to infer each element of digital intelligence conveyed within the interval corresponding to the same integer multiple of four periods of the powerline frequency.

2. The method of claim 1 wherein two independent selected orthogonal families of patterns, formed from two independent types of signaling events, are employed in combination to create a single pseudo-orthogonal family of twice the size of each of the independent families.

3. The method of claim 2 used for the transmission of a succession of single digits of a number system of a base greater than two wherein a single pattern of signaling events is used to represent each such digit.

4. The method of claims 1 or 2 wherein a multiplicity of transmitters operating in synchronism is employed at the same transmitting site for the simultaneous transmission of a plurality of digits.

5. The method of claims 3 wherein a preamble to the message proper is employed to establish the required synchronism between the receiving site and the transmitter.

6. The method of claim 2 wherein one employs quaternary coding in such a manner as to insure that any detection mode which senses a ghost signal will not simultaneously be sensing one of the pair of patterns with which it is properly associated.

7. The method of claim 1 wherein the selected orthogonal family comprises a majority subfamily and at least one minority subfamily so characterized that patterns within the majority subfamily do, and patterns within the minority subfamily do not, exhibit high immunity to noise attributable to a single step in background signaling occurring within the duration of a pattern, with the intent that patterns from the majority subfamily are, and patterns from the minority subfamily are not, used for the representation of elements of digital intelligence.

8. The method of claim 2 wherein the selected pseudo-orthogonal family consists of a majority subfamily and at least one minority subfamily so characterized that patterns within the majority subfamily do, and patterns within the minority subfamily do not, exhibit high immunity to noise attributable to a single step in background signal occurring within the duration of a pattern, with the intent that patterns from the majority subfamily are, and patterns from the minority subfamily are not, used for the representation of elements of digital intelligence.

9. The method of claim 1 wherein step (ii) includes a means for implementing the multiplicity of detection modes whereby the samples from the corresponding portions of successive cycles are digitized, and these digitized samples are then combined in additive and subtractive operations as prescribed in a microprocessor, so as to produce in successive digital outputs from the single microprocessor, digitized quantities which will correspond to the signals resulting from the multiplicity of detection modes.

10. The method of claim 4 wherein a preamble to the message proper is employed to establish the required synchronism between the receiving site and the transmitter.

* * * * *